United States Patent [19]

Morikawa et al.

[11] Patent Number: 5,683,543
[45] Date of Patent: Nov. 4, 1997

[54] PNEUMATIC RADIAL TIRE WITH ZIGZAG ORGANIC FIBER CORED BELT LAYER

[75] Inventors: Tuneo Morikawa; Kazuyuki Kabe; Shuji Takahashi, all of Hiratsuka, Japan

[73] Assignee: The Yokohama Rubber Co., Ltd., Tokyo, Japan

[21] Appl. No.: 615,159

[22] Filed: Mar. 12, 1996

[30]   Foreign Application Priority Data

Mar. 29, 1995 [JP] Japan .................................. 7-072083
Mar. 29, 1995 [JP] Japan .................................. 7-072084

[51] Int. Cl.⁶ .................................................. B60C 9/18
[52] U.S. Cl. ........................ 152/527; 152/526; 152/533; 152/536; 152/537; 156/117
[58] Field of Search ........................... 152/533, 536, 152/526, 527, 537; 156/117

[56]   References Cited

FOREIGN PATENT DOCUMENTS 0501782  9/1992  European Pat. Off. ........... 156/117 X

*Primary Examiner*—Adrienne C. Johnstone
*Attorney, Agent, or Firm*—Nikaido, Marmelstein, Murray & Oram LLP

[57]   ABSTRACT

A pneumatic radial tire is formed by disposing a single steel cord belt layer on the outer side of a carcass layer in a tread, and providing a cylindrical organic fiber cord belt layer of a double structure on the outer side of the steel cord belt layer by winding a tape, which is obtained by burying one or a plurality of organic fiber cords in parallel with each other in a matrix, around the steel cord belt layer while bending the tape zigzag.

9 Claims, 7 Drawing Sheets

One round of zigzag bent tape n=1 n=2 n=3 n=4 n=5 n=6

PNEUMATIC RADIAL TIRE WITH ZIGZAG ORGANIC FIBER CORED BELT LAYER

BACKGROUND OF THE INVENTION

This invention relates to a pneumatic radial tire having excellent high-speed durability and rolling resistance in spite of its small weight, and, moreover, a high uniformity, and able to be manufactured at a low cost.

In a belt portion of a conventional pneumatic radial tire, a steel cord belt layer utilizing the high strength and elastic modulus of steel cords is used. For example, a structure of a belt portion of a pneumatic radial tire having an excellent high-speed durability is formed by helically winding a tape, which comprises rubber-coated nylon cords, as a belt reinforcing layer (a belt covering layer in which an angle of cords with respect to the circumferential direction of the tire is substantially 0°) around an outer circumferential side of a plurality of steel cord belt layers, in which an angle of cords with respect to the circumferential direction of the tire is 10°–30°, and in which the cords in different plies cross each other (Japanese Patent Publication No. 47618/1992). However, since a reinforcing layer of a nylon cord belt is added to steel cord belt layers in this tire, the weight of the tire increases, so that the rolling resistance of the tire increases. Moreover, the number of parts becomes large, and the tire molding efficiency decreases. Since the steel cord belt layers have cut surfaces at both of the widthwise ends thereof, stress is concentrated on these cut surfaces to cause separation to occur readily between the steel cords and a rubber coat, and the high-speed durability to decrease.

SUMMARY OF THE INVENTION

An object of the present invention is to provide a pneumatic radial tire having excellent high-speed durability, rolling resistance and uniformity, and, moreover, being manufacturing at a low cost, by reducing the weight of the tire by using in a belt portion a single steel cord belt layer and an organic fiber cord belt layer of a double structure.

To achieve this object, the present invention provides a pneumatic radial tire characterized in that a single steel cord belt layer is disposed on the outer side of a carcass layer in a tread, a cylindrical organic fiber cord belt layer of a double structure being formed on the outer side of the steel cord belt layer by winding a tape, which is obtained by burying one or a plurality of organic fiber cords in parallel with each other in a matrix, around the steel cord belt layer while bending the tape zigzag, the tire satisfying the relation expression $\tan \theta = n \times D/2\pi r$ wherein $\theta$ represents an angle of the cords in the organic fiber cord belt layer with respect to the circumferential direction of the tire, D a width of the organic fiber cord belt layer, r a radius of the cylinder of the organic fiber cord belt layer, and n the number of zigzag bends of the tape per round of the tire, this relation being $8° < \theta < 32°$. The radius r of the cylinder means a distance on the equator of the tire between the axis of rotation of the tire and the inner surface of the cylindrical organic fiber cord belt layer of a double structure.

Since this pneumatic radial tire is formed by thus disposing a steel cord belt layer of a single structure and an organic fiber cord belt layer of a double structure in a tread portion thereof, the weight of the tire can be reduced as compared with a pneumatic radial tire having a plurality of steel cord belt layers.

Since the organic fiber cord belt layer is formed by winding a tape around the outer circumference of the steel cord belt layer while bending the former, cut surfaces do not occur at both of the widthwise ends (belt edge portions) of this organic fiber cord belt layer, so that separation at an end of this belt layer rarely occurs. This enables the high-speed durability of the tire to be improved.

Since the rolling resistance of the tire decreased owing to the reduction of the weight thereof, and, since the edge portions of the organic fiber cord belt layer do not have cut surfaces, an energy loss due to the inter-layer shearing strain in the belt edge portions becomes small, so that the reduction of rolling resistance of the tire becomes possible. If an angle of the cords in the steel cord layer with respect to the circumferential direction of the tire is set to from 25° to lower than 45°, the high-speed durability of the tire can be further improved. Moreover, owing to the setting of the angle of the cords in the steel cord layer with respect to the circumferential direction of the tire to 45°–65°, an energy loss due to the shearing deformation of the steel cord layer becomes small, and the further reduction of the rolling resistance of the tire thereby becomes possible.

Since the organic fiber cord belt layer is formed by winding a tape around the outer circumferential surface of the steel cord belt layer while bending the tape, a laminated portion (spliced portion), which occurs in a conventional tire of this kind in which two steel cord belt layers are formed by laminating rubber-coated sheets at both of the longitudinal end portions thereof, does not occur. Accordingly, the uniformity (UF) of the tire is improved, and, especially, the radial force variation (RFV) representative of the variation of a reaction force which the tire receives in the radial direction thereof can be reduced.

Moreover, a single steel cord belt layer of a high rigidity is disposed in the belt portion, so that the lateral rigidity of the tire can be secured owing to this steel cord belt layer, whereby the steering stability of a vehicle is not spoiled.

Since the organic fiber cord belt layer the rigidity of which is lower than that of the single steel cord belt layer of a high rigidity is disposed in the belt portion of the tire, the riding comfort of a vehicle can be improved as compared with that of a vehicle having tires in each of which a plurality of steel cord belt layers are provided.

In addition, the number of parts of the belt portion decreases from three (two steel cord belt layers and one reinforcing layer of nylon cord belt) in a conventional tire to two (one steel cord belt layer and one organic fiber cord belt layer of a double structure), and this enables the tire molding efficiency to be improved, and the inexpensive production of the tire to be attained.

DESCRIPTION OF THE PREFERRED EMBODIMENTS

Figure 1:
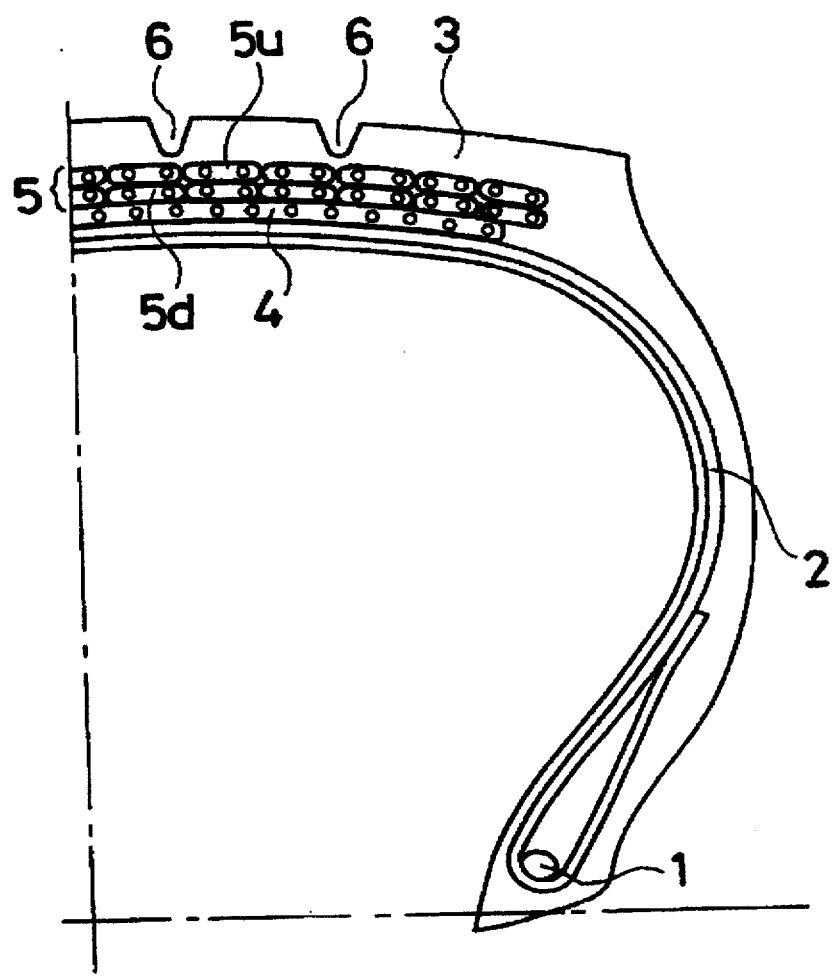
FIG. 1 is an explanatory drawing in half meridian section of an example of the pneumatic radial tire according to the present invention.

Referring to FIG. 1, end portions of a carcass layer 2 are wound up around a pair of left and right bead cores 1 from the inner side of a tire to the outer side thereof. In a tread 3, a single steel cord belt layer 4 is provided on the outer side of the carcass layer 2, and an organic fiber cord belt layer 5 of a double structure comprising outer and inner layers 5$u$, 5$d$ on the outer side of the steel cord belt layer 4 so as to extend in the circumferential direction of the tire over one round thereof.

The surface of the tread 3, i.e. a tread surface is provided with a plurality of grooves 6 extending in the circumferential direction of the tire, and a plurality of grooves (not shown) extending in the widthwise direction of the tire.

Figure 2:
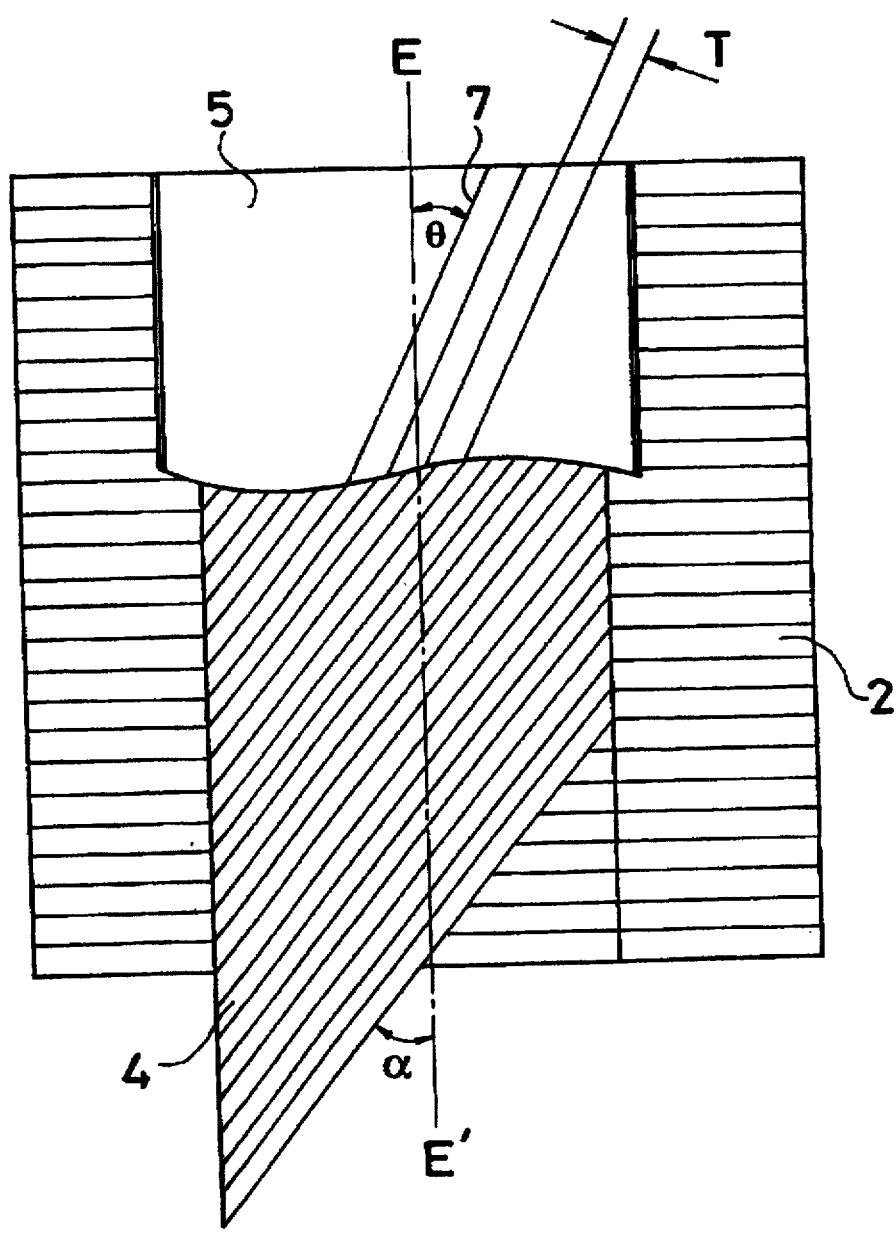
FIG. 2 is an explanatory drawing in plan of a belt portion of an example of the pneumatic radial tire according to the present invention.

In the steel cord belt layer 4, an angle α of cords with respect to the circumferential direction EE' of the tire may be set to from 25° to less than 45°, and preferably 30°–40° as shown in FIG. 2, so as to further improve the high-speed durability of the tire. The reasons why the angle α is set in this manner reside in the statement under "Structural Mechanics of Radial Tires" in a magazine of the Japan Rubber Association, 1978, Vol. 51, No. 3, which says that, even when a belt layer, in which an angle of cords is in the vicinity of a complementary angle of 35.3° of $\tan^{-1}\sqrt{2}=54.7°$, is pulled in the circumferential direction of the tire, the inter-belt layer shearing strain becomes small rapidly, and the rigidity of the belt in the circumferential direction thereof is maintained suitably. Accordingly, the angle of the cords is suitably set to near 35.3° so as to improve the high-speed durability of the tire.

In order to further reduce the rolling resistance of the tire, the angle α of cords of the steel cord belt layer 4 with respect to the circumferential direction of the tire may be set to 45°–65°, and preferably to 50°–60°. The reasons reside in the statement under "Structural Mechanics of Radial Tires" in a magazine of the Japan Rubber Association, 1978, Vol. 51, No. 3, which says that, when the angle of the cords is $\tan^{-1}\sqrt{2}=54.7°$, the inter-layer shearing deformation of the belt portion is suppressed, so that an energy loss in the belt portion decreases, whereby the rolling resistance of the tire lowers. Accordingly, reducing the angle of the cords to a level in the vicinity of 54.7° is recommendable for decreasing the rolling resistance.

When the steel cord belt layer 4 is provided on the outer side of the organic fiber cord belt layer 5, the outer layer becomes easily movable to cause the steering stability of a vehicle to decrease since the rigidity of the outer layer (steel cord belt layer 4) and the inner layer (organic fiber cord belt layer 5) is high and low respectively. Therefore, the steel cord belt layer 4 is disposed on the inner side of the organic fiber cord belt layer 5 in the present invention. This steel cord belt layer 4 may be formed in the same manner as a conventional belt layer of this kind, i.e., by laminating both of the longitudinal end portions of a rubber-coated sheet for a steel cord belt layer on each other.

Figure 3:
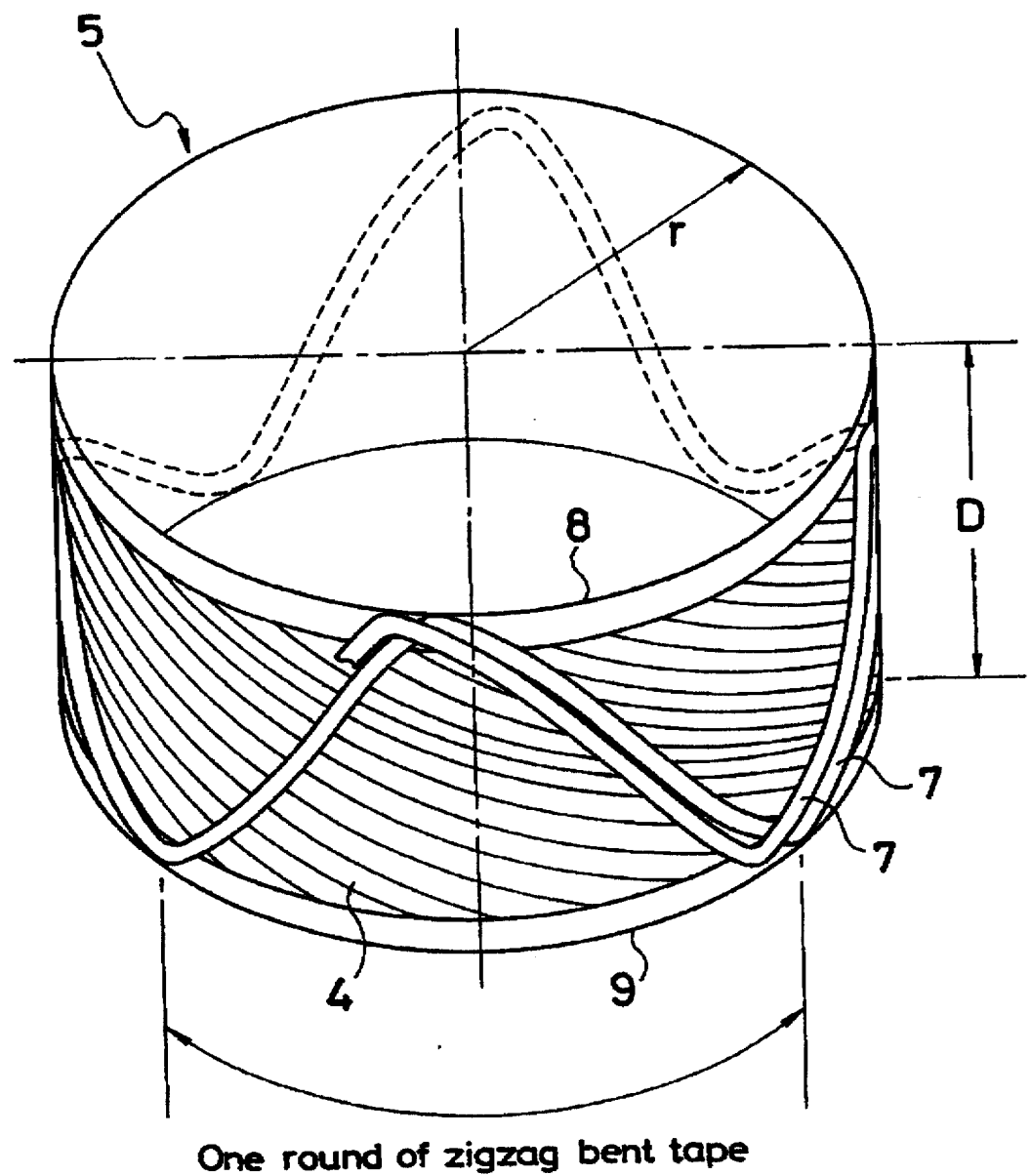
FIG. 3 is an explanatory drawing in perspective showing the condition of formation of an organic fiber cord belt layer in the present invention.

As shown in FIG. 3, the organic fiber cord belt 5 is formed by winding a tape 7, which is obtained by burying one or a plurality of organic fiber cords, preferably 5–10 organic fiber cords in parallel with one another in a matrix, around the outer circumferential surface of the steel cord belt layer 4 while moving the tape zigzag in the widthwise direction of the belt layer 4 over the whole circumference of the tire so that the tape is bent odd or even number of times at widthwise edges 8, 9 projecting outward from both of widthwise edges of the organic fiber cord belt layer 5 by 3–15 mm, preferably by 5–10 mm. The winding of this tape 7 is done a plurality of times by staggering the tape in the circumferential direction thereof by a distance corresponding to the width T of the tape 7, so as not to cause clearances to occur among the wound tape portions. The wound condition of this tape is illustrated in FIG. 4.

Figure 4:
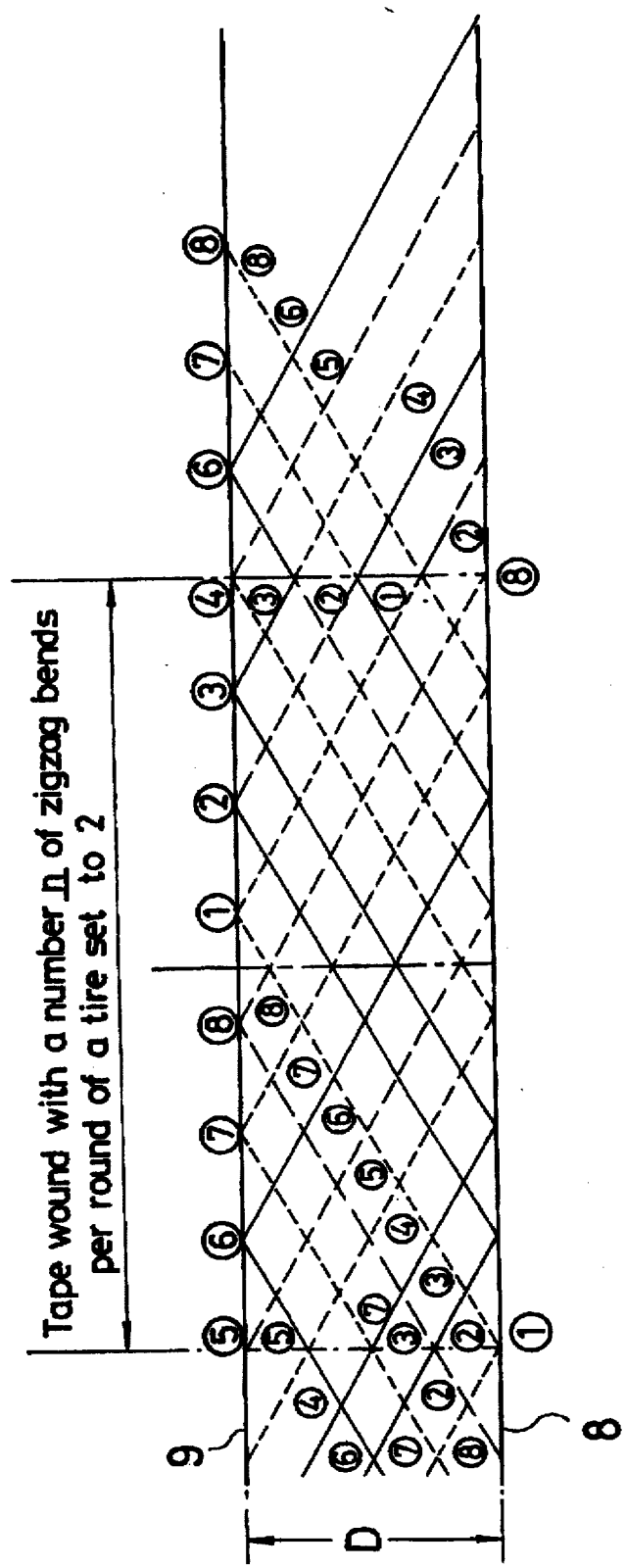
FIG. 4 is an explanatory drawing showing the condition of winding a tape around the steel cord belt layer during the formation of the organic fiber cord belt layer in the present invention.
Figure 5:
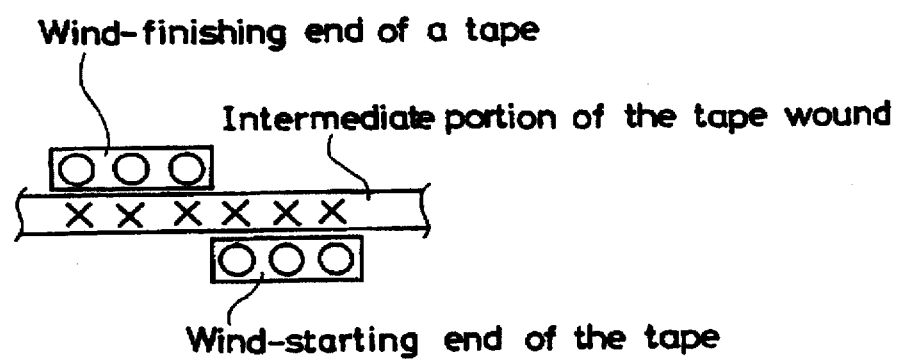
FIG. 5 is an explanatory drawing in section showing the occurrence of a height difference between a wind-starting end portion of a tape and a wind-finishing end portion thereof via an intermediate portion thereof.
Figure 6:
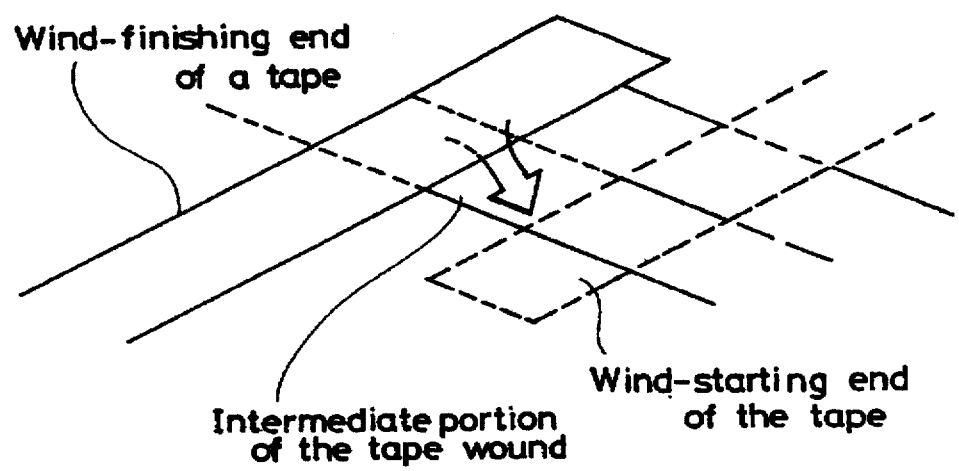
FIG. 6 is an explanatory drawing in plan showing the occurrence of a height difference between a wind-starting end portion of a tape and a wind-finishing end portion thereof via an intermediate portion thereof.

FIG. 4 shows a case where the number per round of the tire of bending the tape 7 zigzag is n=2. Referring to FIG. 4, a wind-starting tape (1) extends from one widthwise edge 8 of an organic fiber cord belt layer 5, and is bent at the other widthwise edge 9, the tape returning to the first-mentioned widthwise edge 8 and communicating with a subsequent tape (2), which is staggered in the circumferential direction of the tire by a distance corresponding to a tape width T from the wind-starting tape (1) and bent at the first-mentioned widthwise edge 8 of the belt layer. This procedure is repeated in order from the tape (2) to a tape (8). Consequently, the tape 7 as a whole is in a two-layer-laminated state at all times, so that an organic fiber cord belt layer 5 obtained is of a two-layer structure (double structure).

When the number per round of the tire of bending the tape 7 zigzag is n=even number, a height difference occurs between a wind-starting end of the wind-starting tape (1) and a wind-finishing end of a wind-finishing tape (8) via intermediate tapes. This height difference is not desirable for the uniformity of a tire.

Figure 7:
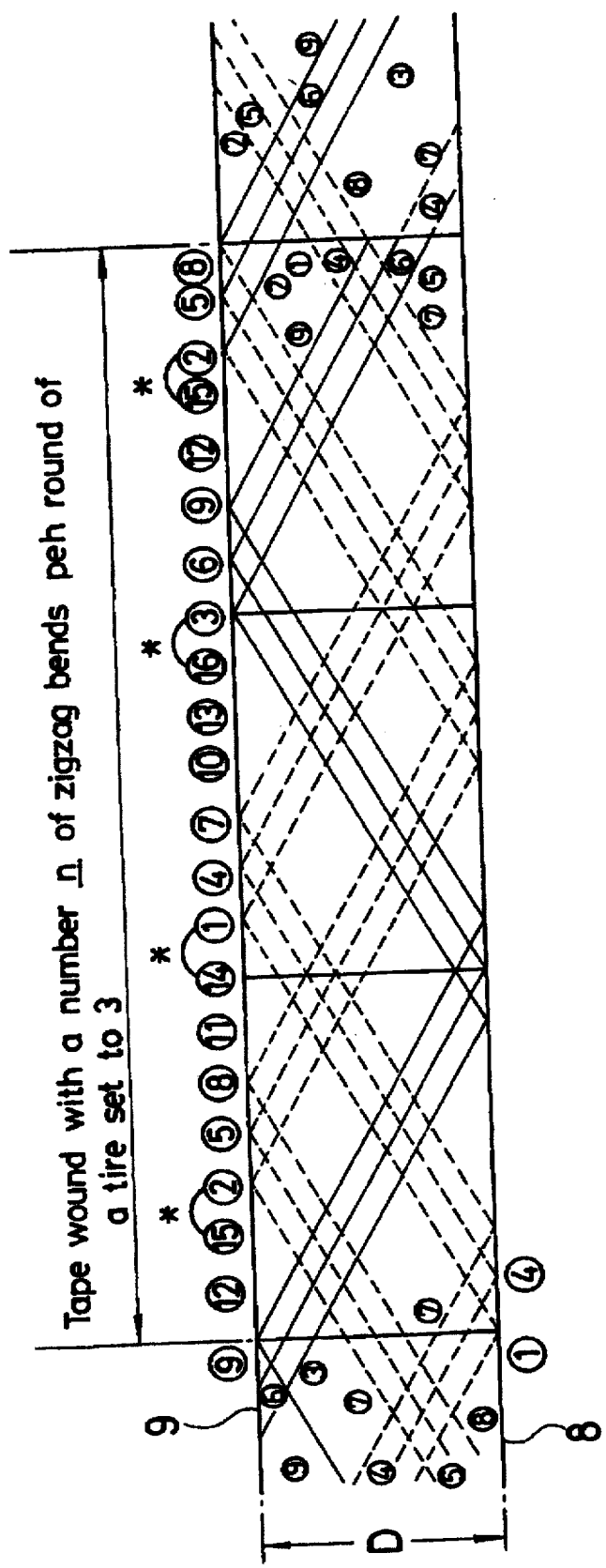
FIG. 7 is another explanatory drawing showing the condition of winding a tape around the steel cord belt layer during the formation of the organic fiber cord belt layer in the present invention.
Figure 8:
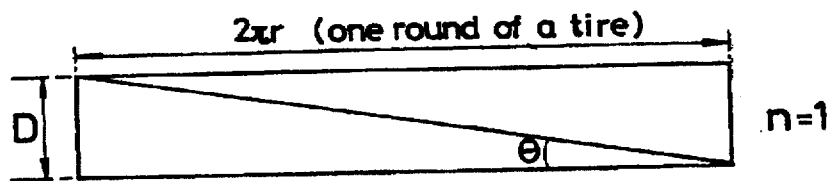
FIG. 8 is a drawing showing the relation between the number of zigzag bends n=1 of the tape per round of the tire and an angle θ of the cords in the organic fiber cord belt layer with respect to the circumferential direction of the tire.
Figure 9:
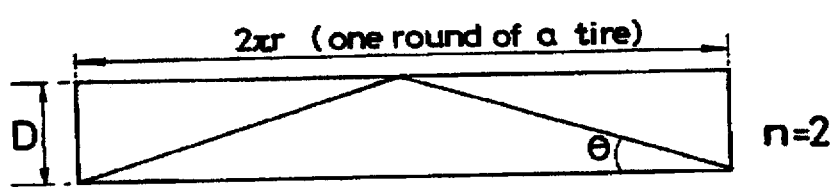
FIG. 9 is a drawing showing the relation between the number of zigzag bends n=2 of the tape per round of the tire and an angel θ of the cords in the organic fiber cord belt layer with respect to the circumferential direction of the tire.
Figure 10:
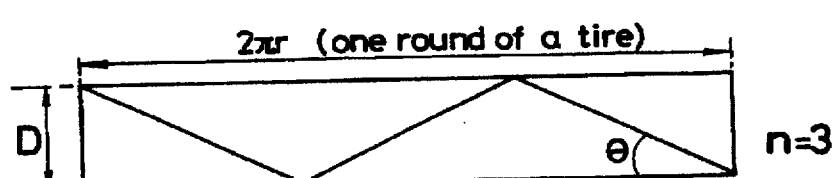
FIG. 10 is a drawing showing the relation between the number of zigzag bends n=3 of the tape per round of the tire and an angle θ of the cords in the organic fiber cord belt layer with respect to the circumferential direction of the tire.
Figure 11:
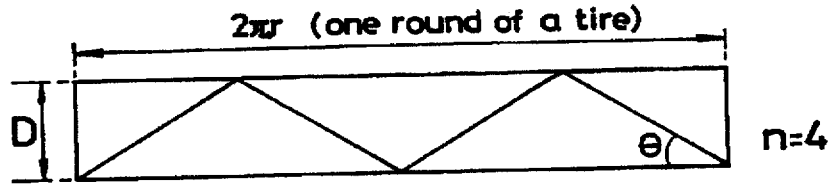
FIG. 11 is a drawing showing the relation between the number of zigzag bends n=4 of the tape per round of the tire and an angle θ of the cords in the organic fiber cord belt layer with respect to the circumferential direction of the tire.
Figure 12:
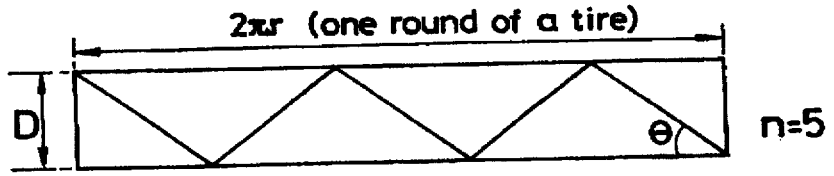
FIG. 12 is a drawing showing the relation between the number of zigzag bends n=5 of the tape per round of the tire and an angle θ of the cords in the organic fiber cord belt layer with respect to the circumferential direction of the tire.
Figure 13:
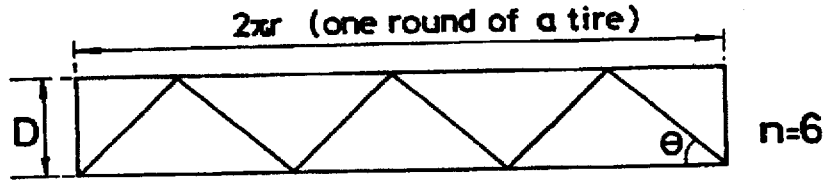
FIG. 13 is a drawing showing the relation between the number of zigzag bends n=6 of the tape per round of the tire and an angle θ of the cords in the organic fiber cord belt layer with respect to the circumferential direction of the tire.

In order to further improve the uniformity of this tire, the number n per round of a tire of bending the tape 7 zigzag is preferably set to an odd number. When the number n is set to an odd number, the tire does not encounter the concentrated occurrence of height differences shown by "*" in FIG. 7, between a wind-starting end of a wind-starting tape and a wind-finishing end of a wind-finishing tape but height differences occur among the intermediate portions of the tapes being wound, such height differences scattering over the whole circumferential part of the tire.

The relation between the number n per round of a tire of bending the tape 7 zigzag and an angle θ of cords in the organic fiber cord belt layer 5 with respect to the circumferential direction of the tire is shown in FIGS. 8–13. FIGS. 8–13 show the cases where n is 1, 2, 3, 4, 5 and 6 respectively. As is understood from FIGS. 8–13, θ increased in proportion to n. Therefore, in order to set θ=8°–32° in the present invention by bending the tape 7 even number of times, n is set to 2, 4, 6 or 8, and, in order to set θ to the same level by bending the tape odd number of times, n is set to 3, 5, 7 or 9.

According to the present invention, the cylindrical organic fiber cord belt layer 5 of a double structure is formed in the above-mentioned manner so that it satisfies the relation of $\tan\theta = n\times D/2\pi r$ wherein θ, D, r and n represent an angle of cords with respect to the circumferential direction of the tire, width of the layer 5, radius of the cylinder thereof and the number per round of the tire of bending the tape 7 zigzag, respectively, and also so that $8° < \theta < 32°$. The reason resides in that θ is determined depending upon the number n of times, width D and radius r of the cylinder.

The fiber cords used for the tape 7 preferably comprise cords each of which has an elongation percentage of not larger than 4 measured with a load of 2.25 g/d imparted thereon. When the elongation percentage exceeds 4, the tensile rigidity of the cord becomes excessively low, so that the rigidity of the belt and high-speed durability of the tire decreases.

This fiber cord is obtained by intertwisting one or not less than two kinds of fibers selected from the group including, for example, aromatic polyamide fiber, polyallylate fiber, polyparaphenylene benzbisoxazole fiber, polyvinyl alcohol fiber, rayon fiber, polyethylene terephthalate fiber and polyethylene 2,6-naphthalate fiber.

The tape 7 is formed by burying one or a plurality of such fiber cords in parallel with one another in a matrix. The matrix used in this case can be formed out of a plastic, such as a urethane resin, the material not being limited to rubber.

EXAMPLES (1) Regarding the following tires 1–4 according to the present invention, and conventional tire 1, the high-speed durability, rolling resistance and uniformity were evaluated under the following conditions. The results are shown in Table 1.

Conditions

Air pressure: 1.9 kg/cm², rim: 14×51/2JJ, load: 450 kg
Tire size: 195/70 R14

Tire 1 according to the present invention

Steel cord belt layer: 1, steel cords: 2+2 (0.25), end count: 40/50 mm width: 125 mm, and angle α of cords with respect to the circumferential direction of the tire: 35°.

Organic fiber cord belt layer of a double structure, a sheet of 2-ply cords having an end count of 50/50 mm of 1500 denier high-modulus polyester fiber was arranged in the shape of a tape of 10 mm in width, and this product was wound in two layers around the outer circumference of the steel cord belt layer, n=2, θ=8°.

Outer shape of the tire: 635 mm, width D of the belt layer: 135 mm, radius r of the belt layer: 305 mm $$\tan\theta = n\times D/2\pi r = n\times 135\text{mm}/(2\pi\times 305\text{ mm})$$

Tire 2 according to the present invention

Same as the tire 1 according to the present invention except that n=4 and θ=16°.

Tire 3 according to the present invention

Same as the tire 1 according to the present invention except that n=6 and θ=23°.

Tire 4 according to the present invention

Same as the tire 1 according to the present invention except that n=3 and θ=29°.

Conventional tire 1

Steel cord belt layer: 2, angle of cords with respect to the circumferential direction of the tire: 20°, and cords in different plies cross each other.

Inner steel cord belt layer: Steel cords: 2+2 (0.25), end count: 40/50 mm, and width: 130 mm.

Outer steel cord belt layer: Steel cords: 2+2 (0.25), end count: 40/50 mm, and width: 120 mm.

Belt reinforcing layer: 1, this is formed by winding a sheet of 2-ply cords having an end count of 50/50 mm of 840 denier nylon fiber around the outer circumference of the outer steel cord belt layer helically and continuously at a very small angle with respect to the circumferential direction of the tire and in a width of 10 mm, and width of the layer: 140 mm.

High-speed durability

After JATMA high-speed durability tests using a drum of 1707 mm in diameter had been completed, breakage tests were continued until the tires were broken, by incrementing the rotational speed by 10 km/hr. The results are shown by indexes based on 100 representative of the high-speed durability of the conventional tire 1. The larger indexes mean higher high-speed durability.

It is understood the tires having smaller cord angles θ (smaller n) have higher high-speed durability.

Rolling resistance

The measurement was conducted by a regularly used method using an indoor drum type tire rolling resistance test machine. The results are shown by indexes based on 100 representative of the rolling resistance of the conventional tire 3. The larger values of the indexes mean more desirable rolling resistance (the rolling resistance is lower).

Uniformity

Tests were conducted on the basis of JASO C607 "Method of testing the uniformity of automobile tires". The results are shown by indexes based on 100 representative of the uniformity of the conventional tire 1. The larger indexes mean higher uniformity.

TABLE 1

|  | Number n of bends | Cord angle θ | Uniformity | High-speed durability (index) | Rolling resistance | Weight ratio of the belt portion | Cost of the belt portion |
| --- | --- | --- | --- | --- | --- | --- | --- |
| Conventional tire 1 | — | — | 100 | 100 | 100 | 100 | 100 |
| Tire 1 of Invention | 2 | 8° | 100 | 115 | 105 | 92 | 84 |
| Tire 2 of Invention | 4 | 16° | 100 | 110 | 105 | 92 | 84 |
| Tire 3 of Invention | 6 | 23° | 105 | 105 | 100 | 92 | 84 |
| Tire 4 of Invention | 8 | 29° | 105 | 105 | 100 | 92 | 84 |

As is clearly understood from Table 1, the tires 1–4 according to the present invention is excellent in all of the high-speed durability, rolling resistance and uniformity.

(2) Regarding the tires 5–8 according to the present invention and conventional tire 2, the high-speed durability, rolling resistance and uniformity were evaluated under the following conditions in the same manner as mentioned above. The results are shown in Table 2.

Conditions

Air pressure: 1.9 kg/cm$^2$, rim: 14×51/2JJ, load: 450 kg

Tire size: 195/70 R14

Tire 5 according to the present invention

Steel cord belt layer: 1, steel cords: 2+2 (0.25), end count: 40/50 mm, width: 125 mm, and cord angle α with respect to the circumferential direction of the tire: 35°.

Organic fiber cord belt layer of a double structure, a sheet of 2-ply cords having an end count of 50/50 mm of 1500 denier aromatic polyamide fiber was arranged in the shape of a tape of 10 mm in width, and this product was wound in two layers around the outer circumference of the steel cord belt layer, n=3, θ=12°.

Outer shape of tire: 635 mm, width D of belt layer: 135 mm, radius r of the belt layer: 305 mm tan θ=n×D/2πr=n×135 mm/(2π×305 mm)

Tire 6 according to the present invention

Same as the tire 5 according to the present invention except that n=5 and θ=19°.

Tire 7 according to the present invention

Same as the tire 5 according to the present invention except that n=7 and θ=26°.

Tire 8 according to the present invention

Same as the tire 5 according to the present invention except that n=9 and θ=32°.

Conventional tire 2

Steel cord belt: 2, angle of cords with respect to the circumferential direction of the tire: 20°, and cords in different plies cross each other.

Inner steel cord belt layer: Steel cords: 2+2 (0.25), end count: 40/50 mm, and width: 130 mm.

Outer steel cord belt layer: Steel cords: 2+2 (0.25), end count: 40/50 mm, and width: 120 mm.

Belt reinforcing layer: 1, this is formed by winding a sheet of 2-ply cords having an end count of 50/50 mm of 840 denier nylon fiber around the outer circumference of the outer steel cord belt layer helically and continuously at a very small angle with respect to the circumferential direction of the tire and in a width of 10 mm, and width of layer: 140 mm.

TABLE 2

|  | Number n of bends | Cord angle θ | Uniformity | High-speed durability (index) | Rolling resistance | Weight ratio of the belt portion | Cost of the belt portion |
| --- | --- | --- | --- | --- | --- | --- | --- |
| Conventional tire 2 | — | — | 100 | 100 | 100 | 100 | 100 |
| Tire 5 of Invention | 3 | 12° | 105 | 125 | 105 | 92 | 94 |
| Tire 6 of Invention | 5 | 19° | 105 | 120 | 105 | 92 | 94 |
| Tire 7 of Invention | 7 | 26° | 110 | 110 | 100 | 92 | 94 |
| Tire 8 of Invention | 9 | 32° | 110 | 105 | 100 | 92 | 94 |

As is clearly understood from Table 2, the tires 5–8 according to the present invention are excellent in all of the high-speed durability, rolling resistance and uniformity.

(3) Regarding the following tires 9–12 according to the present invention and conventional tire 3, the high-speed durability, rolling resistance and uniformity were evaluated in the same manner as mentioned above, under the following conditions. The results are shown in Table 3.

Conditions

Air pressure: 1.9 kg/cm$^2$, rim: 14×51/2JJ, load: 450 kg

Tire size: 195/70 R14

Tire 9 according to the present invention

Steel cord belt layer: 1, steel cords: 2+2 (0.25), end count: 40/50 mm, width: 125 mm, and cord angle α with respect to the circumferential direction of the tire: 55°.

Organic fiber cord belt layer of a double structure, a sheet of 2-ply cords having an end count of 50/50 mm of 1500 denier high-modulus polyester fiber was arranged in the shape of a tape of 10 mm in width, and this product was wound in two layers around the outer circumference of the steel cord belt layer, n=2, θ=8°.

Outer shape of tire: 635 mm, width D of belt layer: 135 mm, radius r of the belt layer: 305 mm $$\tan \theta = n \times D / 2\pi r = n \times 135 \text{ mm}/(2\pi \times 305 \text{ mm})$$

Tire 10 according to the present invention
Same as the tire 9 according to the present invention except that n=4, θ=16°.

Tire 11 according to the present invention
Same as the tire 9 according to the present invention except that n=6 and θ=23°.

Tire 12 according to the present invention
Same as the tire 9 according to the present invention except that n=8 and θ=29°.

Conventional tire 3
Steel cord belt layer: 2, cord angle with respect to the circumferential direction of the tire: 20°, and cords in different plies cross each other.

Inner steel cord belt layer: Steel cords 2+2 (0.25), end count 40/50 mm, and width: 130 mm.

Outer steel cord belt layer: Steel cords 2+2 (0.25), end count: 40/50 mm, and width: 120 mm.

Belt reinforcing layer: 1, this is formed by winding a sheet of 2-ply cords having an end count of 50/50 mm of 840 denier nylon fiber around the outer circumference of the outer steel cord belt layer helically and continuously at a very small angle with respect to the circumferential direction of the tire and in a width of 10 mm, and width of layer: 140 mm.

Conditions
Air pressure: 1.9 kg/cm², rim: 14×5½JJ, load: 450 kg
Tire size: 195/70 R14

Tire 13 according to the present invention
Steel cord belt layer: 1, steel cords: 2+2 (0.25), end count: 40/50 mm, width: 125 mm, and cord angle α with respect to the circumferential direction of the tire: 55°.

Organic fiber cord belt layer of a double structure, a sheet of 2-ply cords having an end count of 50/50 mm of 1500 denier aromatic polyamide fiber was arranged in the shape of a tape of 10 mm in width, and this product was wound in two layers around the outer circumferential surface of the steel cord belt layer, n=3, θ=12°.

Outer shape of tire: 635 mm, width D of belt layer: 135 m, radius r of the belt layer: 305 mm $$\tan \theta = n \times D/2\pi r = n \times 135 \text{ mm}/(2\pi \times 305 \text{ mm})$$

Tire 14 according to the present invention
Same as the tire 13 according to the present invention except that n=5 and θ=19°.

Tire 15 according to the present invention
Same as the tire 13 according to the present invention except that n=7 and θ=26°.

Tire 16 according to the present invention
Same as the tire 13 according to the present invention except that n=9 and θ=32°.

Conventional tire 4
Steel cord belt layer: 2, cord angle with respect to the circumferential direction of the tire: 20°, and cords in different plies cross each other.

Inner steel cord belt layer: Steel cords 2+2 (0.25), end count: 40/50 mm, and width: 130 mm.

TABLE 3

| | Number n of bends | Cord angle θ | Uniformity | High-speed durability (index) | Rolling resistance | Weight ratio of the belt portion | Cost of the belt portion |
|---|---|---|---|---|---|---|---|
| Conventional tire 3 | — | — | 100 | 100 | 100 | 100 | 100 |
| Tire 9 of Invention | 2 | 82° | 100 | 110 | 110 | 92 | 84 |
| Tire 10 of Invention | 4 | 16° | 100 | 105 | 110 | 92 | 84 |
| Tire 11 of Invention | 6 | 23° | 105 | 100 | 105 | 92 | 84 |
| Tire 12 of Invention | 8 | 29° | 105 | 100 | 105 | 92 | 84 |

As is clearly understood from Table 3, the tires 9–12 according to the present invention are excellent in all of the high-speed durability, rolling resistance and uniformity.

(4) Regarding the following tires 13–16 according to the present invention and conventional tire 4, the high-speed durability, rolling resistance and uniformity were evaluated in the same manner as in (3) above under the following conditions. The results are shown in Table 4.

Outer steel cord belt layer: Steel cords 2+2 (0.25), end count: 40/50 mm, and width: 120 mm.

Belt reinforcing layer: 1, this is formed by winding a sheet of 2-ply cords having an end count of 50/50 mm of 840 denier nylon fiber around the outer circumference of the outer steel cord belt layer helically and continuously at a very small angle with respect to the circumferential direction of the tire and in a width of 10 mm, and width of layer: 140 mm.

TABLE 4

|  | Number n of bends | Cord angle θ | Uniformity | High-speed durability (index) | Rolling resistance | Weight ratio of the belt portion | Cost of the belt portion |
| --- | --- | --- | --- | --- | --- | --- | --- |
| Conventional tire 4 | — | — | 100 | 100 | 100 | 100 | 100 |
| Tire 13 of Invention | 3 | 12° | 105 | 115 | 110 | 92 | 94 |
| Tire 14 of Invention | 5 | 19° | 105 | 110 | 110 | 92 | 94 |
| Tire 15 of Invention | 7 | 26° | 110 | 105 | 105 | 92 | 94 |
| Tire 16 of Invention | 9 | 32° | 110 | 100 | 105 | 92 | 94 |

As is clearly understood from Table 4, the tires 13–16 according to the present invention are excellent in all of the high-speed durability, rolling resistance and uniformity.

As described above, the pneumatic radial tire according to the present invention is formed by disposing a single steel cord belt layer on the outer side of a carcass layer in a tread, and providing a cylindrical organic fiber cord belt layer of a double structure on the outer side of the steel cord belt layer by winding a tape, which is obtained by burying one or a plurality of organic fiber cords in parallel with other in a matrix, around the steel cord belt layer while bending the tape zigzag an even or odd number of times per round of the tire, the tire satisfying the relation expression $\tan \theta = n \times D / 2\pi r$ wherein θ represents an angle of the cords in the organic fiber cord belt layer with respect to the circumferential direction of the tire, D a width of the organic fiber cord belt layer, r a radius of the cylinder of the organic fiber cord belt layer, and n the number of zigzag bends of the tape per round of the tire, this relation being $8° < \theta < 32°$. This enables the weight of the tire to decrease, the high-speed durability and rolling resistance thereof to become excellent, and, moreover, the uniformity thereof to be improved. Since the organic fiber cord belt layer in the present invention is formed by winding a tape around the outer circumference of the steel cord belt layer while bending the tape zigzag with respect to the whole circumference of the tire, it can be manufactured by a belt molding drum which has heretofore been used. Accordingly, no additional equipment need be provided for this purpose, so that the pneumatic radial tire can be manufactured at a low cost.

What is claimed is:

1. A pneumatic radial tire characterized in that a single steel cord belt layer is disposed on the outer side of a carcass layer in a tread, a cylindrical organic fiber cord belt layer of a double structure being formed on the outer side of said steel cord belt layer by winding a tape, which is obtained by burying one or a plurality of organic fiber cords in parallel with each other in a matrix, around said steel cord belt layer while bending said tape zigzag, said tire satisfying the relation expression $\tan \theta = n \times D / 2\pi r$ wherein θ represents an angle of the cords in said organic fiber cord belt layer with respect to the circumferential direction of said tire, D a width of said organic fiber cord belt layer, r a radius of said cylinder of said organic fiber cord belt layer, and n the number of zigzag bends of said tape per round of said tire, said relation being $8° < \theta < 32°$.

2. A pneumatic radial tire according to claim 1, wherein said number n of zigzag bends per round of said tire of said tape is an even number.

3. A pneumatic radial tire according to claim 2, wherein said number n of zigzag bends per round of said tire of said tape is 2, 4, 6 or 8.

4. A pneumatic radial tire according to claim 1, wherein said number n of zigzag bends per round of said tire of said tape is an odd number.

5. A pneumatic radial tire according to claim 4, wherein said number n of zigzag bends per round of said tire of said tape is 3, 5, 7 or 9.

6. A pneumatic radial tire according to any one of claims 1–5, wherein said organic fiber cords are obtained by inter-twisting one or not less than two kinds of fibers selected from the group consisting of aromatic polyamide fiber, polyallylate fiber, polyparaphenylene benzbisoxazole fiber, polyvinyl alcohol fiber, rayon fiber, polyethylene terephthalate fiber and polyethylene 2,6-naphthalate fiber.

7. A pneumatic radial tire according to any one of claims 1–5, wherein said matrix is one kind of material selected from the group consisting of rubber and plastic.

8. A pneumatic radial tire according to any one of claims 1–5, wherein the angle of cords in said steel cord belt layer with respect to the circumferential direction of said tire is from 25° to less than 45°.

9. A pneumatic radial tire according to any one of claims 1–5, wherein the angle of cords in said steel cord belt layer with respect to the circumferential direction of said tire is 45°–65°.

* * * * *